(12) United States Patent
Taxier et al.

(10) Patent No.: US 12,395,692 B2
(45) Date of Patent: *Aug. 19, 2025

(54) APPARATUS, SYSTEMS AND METHODS FOR ELECTRONIC PROGRAM GUIDE INFORMATION PRESENTED ON A DISPLAY

(71) Applicant: DISH Technologies L.L.C., Englewood, CO (US)

(72) Inventors: Karen Taxier, Highlands Ranch, CO (US); Morgan Kirby, Palmer Lake, CO (US)

(73) Assignee: DISH Technologies L.L.C., Englewood, CO (US)

( * ) Notice: Subject to any disclaimer, the term of this patent is extended or adjusted under 35 U.S.C. 154(b) by 175 days.

This patent is subject to a terminal disclaimer.

(21) Appl. No.: 18/323,282

(22) Filed: May 24, 2023

(65) Prior Publication Data

US 2023/0300404 A1 Sep. 21, 2023

Related U.S. Application Data

(63) Continuation of application No. 17/720,061, filed on Apr. 13, 2022, now Pat. No. 11,671,648, which is a continuation of application No. 16/595,382, filed on Oct. 7, 2019, now Pat. No. 11,310,555, which is a continuation of application No. 14/826,419, filed on Aug. 14, 2015, now Pat. No. 10,440,421.

(51) Int. Cl.
| | |
|---|---|
| H04N 5/445 | (2011.01) |
| H04N 21/431 | (2011.01) |
| H04N 21/472 | (2011.01) |
| H04N 21/482 | (2011.01) |
| H04N 21/81 | (2011.01) |
| H04N 21/8549 | (2011.01) |

(52) U.S. Cl.
CPC ... *H04N 21/4316* (2013.01); *H04N 21/47202* (2013.01); *H04N 21/4821* (2013.01); *H04N 21/8133* (2013.01); *H04N 21/8549* (2013.01)

(58) Field of Classification Search
CPC ......... H04N 21/4316; H04N 21/47202; H04N 21/4821; H04N 21/8133; H04N 21/8549
USPC ...................................................... 725/41
See application file for complete search history.

(56) References Cited

U.S. PATENT DOCUMENTS

| | | | |
|---|---|---|---|
| 5,253,066 A | 10/1993 | Vogel | |
| 5,353,121 A | 10/1994 | Young et al. | |
| 5,559,550 A | 9/1996 | Mankovitz | |
| 5,844,620 A | 12/1998 | Coleman et al. | |
| 5,929,932 A * | 7/1999 | Otsuki | H04N 21/454 |
| | | | 725/47 |
| 5,959,932 A | 9/1999 | Maclellan et al. | |
| 5,986,650 A | 11/1999 | Ellis et al. | |

(Continued)

OTHER PUBLICATIONS

"Mini Guide (Browse)." Armstrong Cable Television Support: On-Screen Guide, Armstrong, n.d. Web. Jun. 24, 2015. <http://armstrongonewire.com/support/television/articles/guide-mini.aspx>.

*Primary Examiner* — Nasser M Goodarzi
*Assistant Examiner* — Sahar Aqil Riaz
(74) *Attorney, Agent, or Firm* — Perkins Coie LLP

(57) ABSTRACT

Systems and methods are operable to present an enhanced electronic program guide (EPG). The enhanced EPG comprises a reduced size video, a mini guide, a single channel guide bar, and an optional preview guide bar.

21 Claims, 5 Drawing Sheets

(56) References Cited

U.S. PATENT DOCUMENTS

| | | | |
|---|---|---|---|
| 6,028,599 A | 2/2000 | Yuen et al. | |
| 6,175,362 B1 | 1/2001 | Harms et al. | |
| 6,177,931 B1 * | 1/2001 | Alexander | H04N 21/42204 |
| | | | 348/E7.071 |
| 6,477,705 B1 | 11/2002 | Yuen et al. | |
| 6,515,680 B1 | 2/2003 | Hendricks et al. | |
| 6,532,590 B1 * | 3/2003 | Chimoto | H04N 21/47 |
| | | | 725/43 |
| 7,137,135 B2 | 11/2006 | Schein et al. | |
| 7,218,839 B2 | 5/2007 | Plourde, Jr. et al. | |
| 7,546,621 B2 | 6/2009 | Lajoie et al. | |
| 7,703,041 B2 | 4/2010 | Ito et al. | |
| 7,996,864 B2 | 8/2011 | Yuen et al. | |
| 8,151,215 B2 | 4/2012 | Baurmann et al. | |
| 8,935,728 B2 | 1/2015 | Stallings et al. | |
| 8,966,530 B2 | 2/2015 | Sinha et al. | |
| 9,843,841 B2 | 12/2017 | Smith et al. | |
| 9,930,417 B2 | 3/2018 | Stark et al. | |
| 10,440,421 B2 | 10/2019 | Taxier et al. | |
| 2002/0059602 A1 | 5/2002 | Macrae et al. | |
| 2002/0078459 A1 | 6/2002 | McKay | |
| 2002/0170057 A1 | 11/2002 | Barrett et al. | |
| 2003/0016304 A1 | 1/2003 | Norsworthy et al. | |
| 2004/0148628 A1 | 7/2004 | Mears | |
| 2004/0239809 A1 | 12/2004 | Kim et al. | |
| 2005/0044565 A1 | 2/2005 | Jerding et al. | |
| 2005/0155052 A1 | 7/2005 | Ostrowska et al. | |
| 2006/0174270 A1 | 8/2006 | Westberg et al. | |
| 2007/0022450 A1 * | 1/2007 | Kim | H04N 21/4316 |
| | | | 725/86 |
| 2008/0271078 A1 | 10/2008 | Gossweiler et al. | |
| 2009/0049474 A1 | 2/2009 | Jinseok | |
| 2009/0165052 A1 * | 6/2009 | Lee | H04N 21/4821 |
| | | | 725/40 |
| 2009/0278987 A1 | 11/2009 | Liu | |
| 2010/0162315 A1 * | 6/2010 | Hyun | H04N 21/4314 |
| | | | 725/44 |
| 2012/0117601 A1 | 5/2012 | Yeh et al. | |
| 2012/0297422 A1 | 11/2012 | Mountain | |
| 2013/0019263 A1 | 1/2013 | Ferren et al. | |
| 2013/0290233 A1 | 10/2013 | Ferren et al. | |
| 2016/0134910 A1 | 5/2016 | Davis et al. | |
| 2020/0045362 A1 | 2/2020 | Taxier et al. | |
| 2022/0239976 A1 | 7/2022 | Taxier | |

* cited by examiner

APPARATUS, SYSTEMS AND METHODS FOR ELECTRONIC PROGRAM GUIDE INFORMATION PRESENTED ON A DISPLAY

CROSS-REFERENCE TO RELATED APPLICATION

This application is a continuation of U.S. patent application Ser. No. 17/720,061, filed Apr. 13, 2022, which is a continuation of U.S. patent application Ser. No. 16/595,382, filed Oct. 7, 2019, which is a continuation of U.S. patent application Ser. No. 14/826,419, filed Aug. 14, 2015, both of which are incorporated herein by reference in their entirety.

BACKGROUND

Media devices, such as a set top box, are configured to receive media content events (referred to herein interchangeably as a "program") from a broadcasting system. Non-limiting examples of media content events include movies, news programs, sporting events, serial comedies or dramas, and other thematic-based media content even programming. Media content evens may also include advertisements, commercials or the like.

The media content events may be communicated to the media device by a program service provider over the broadcasting system. Non-limiting examples of broadcasting systems include satellite systems, cable or other wire-based systems, or over the air (OTA) broadcasting systems. Media content events may also be accessed from other sources, such as a web site or an on-demand content source via the Internet or other suitable communication system.

A legacy electronic program guide (EPG) may be used to present program viewing selection choices to a user. The legacy EPG has the look and feel of a table that uses a combination of text and/or symbols to indicate the program viewing choices that may be selected by the user. The legacy EPG is a type of a user interface that presents a menu, or a series of menus, that describe available programs that are available for presentation.

Typically, a first vertical bar (shown on the left-hand side of the EPG) indicates various program provider sources (referred to herein interchangeably as a "station") of the available programming. The vertical column in typically divided into a series of blocks (referred to herein interchangeably as a "legacy channel information block"), wherein each legacy channel information block presents information that identifies one of a plurality of different stations.

Stations are typically identified by an assigned channel identifier. The identifier is typically a numeral (referred to herein interchangeably as a "channel number"), that is indicated in the legacy channel information block. Further, a station is also identified in the legacy channel information block by an assigned call sign (referred to herein interchangeably as call letters). The call letters of a station is typically a series of three or more letters or other alpha numeric characters. The call letters intuitively identifies the station to the user. For example, a particular station may be identified using a channel number of 123 and the call letters "XYZ" that have been assigned to a particular station. When the user views a legacy channel information block with the call letters "XYZ" on a presented legacy EPG, the user intuitively recognizes that particular station. Over time, the user may associate the station and its call sign with the assigned channel number.

Other textual and/or image information may also be indicated in a legacy channel information block, such as, but not limited to, characteristics that describe typical content provided by the station or location of the station identified in the legacy channel information block. For example, a legacy channel information block may include the text "Denver News" to indicate to the user that the station is located in Denver and that the station typically is presenting news related information in its various programs. The legacy channel information block may also include an image, such as a logo, a trademarked graphical icon, or the like that is notoriously well known to the public as being associated with that particular station.

Typically, the legacy channel information block identifying a plurality of available stations are arranged on the presented legacy EPG in consecutive order based on the station's channel number. However, a legacy EPG may be configured to present legacy channel information blocks in an order based on genre, type of content, or other characteristics. The characteristics may be user specified or user selected. For example, a legacy EPG may present a plurality of legacy channel information blocks that are associated with the user's favorite channels. As another example, a plurality of legacy channel information blocks identifying stations that present movies, children's programming, sporting events, news programming, or the like.

A presented legacy EPG also indicates information pertaining to available programs that are provided by each of the various stations. Typically, information describing an individual program is presented in a block (referred to herein interchangeably as a "legacy program information block"). The width of a legacy program information block varies based on the duration of that particular program. For example, the legacy program information block for a two hour long movie may be four times as long (wide) as a legacy program information block for a half hour serial program.

Typically, the display area of a legacy EPG that presents a plurality of legacy program information blocks (referred to herein interchangeably as the "program information block display field") has a sufficient width to permit display of a plurality of legacy program information blocks indicating available programs over some predefined span of time. Thus, a time ordered series of legacy program information blocks may be presented in the horizontal bar that spans the particular time period shown on the legacy EPG (wherein the time period corresponds to the total width of the horizontal bar of legacy program information blocks). The horizontal row of legacy program information blocks indicating programming available from a particular station are aligned with the legacy channel information block of that station so that the viewing user intuitively understands that the programs in a particular horizontal bar of legacy program information blocks are being provided by the station indicated in the aligned legacy channel information block.

Preferably, the legacy EPG further includes a supplemental horizontal bar that indicates a time scale (referred to herein interchangeably as the "time scale bar"). The legacy time scale bar typically is a time scale that demarks time units. The legacy time scale bar is typically divided up by units of time corresponding to the hour or half hour. Hours of the day may be used to indicate particular units of time. Further, the date and/or day of the week may be indicated on the legacy time scale bar. The legacy time scale bar may be shown above or below the field of the legacy EPG that presents the plurality of channel information blocks and the associated legacy program information blocks.

Information presented in a particular legacy program information block may include the title of available program, and optionally a brief textual description of the program. Some legacy EPGs may be configured to present an image and/or a short thumbnail video clip in a legacy program information block. Since any particular legacy program information block is arranged in a horizontal bar that is aligned with the station that is providing that program, the user intuitively identifies the particular station providing the program. Further, since the legacy program information blocks are arranged in a time ordered sequence, the user intuitively appreciates the scheduled time and date of the program presentation because each individual legacy program information block is in vertical alignment with a particular unit of time shown on the presented time scale bar.

A presented legacy EPG is interactive with the user. Accordingly, the user is able to "scroll" or "navigate" about the legacy EPG to select a program of interest. Typically, a currently active legacy program information block is indicated using a suitable focusing means such that the visibility of the focused legacy program information block is highlighted, thus increasing the awareness of the focused legacy program information block to a user viewing the legacy EPG. Focusing may be implemented by using any suitable highlighting means, such as using a predefined color for text font and/or background, using a predefined background fill pattern, using a heightened brightness or the like. Accordingly, the focusing differentiates the active legacy program information block from other legacy program information blocks indicated on the legacy EPG.

If the user selects a particular active legacy program information block identifying a program that is currently being broadcast, the presentation on the display automatically changes from presentation of the legacy EPG to presentation of that particular program associated with the selected active legacy program information block. If the active legacy program information block identifies a program that is scheduled for presentation at some future time, then an optional recording feature may be automatically executed such that when that particular program is broadcasted at its scheduled time, the program is automatically recorded by a media device that is receiving the program.

A current problem in the arts is that legacy EPGs are inherently limited in the amount of information that can be presented at a single moment by the size (dimensions) of the display that is presenting the legacy EPG to a user. For example, a limited number of legacy channel information blocks may be shown in a vertical column of the legacy EPG due to the height of the display. For example, a legacy EPG may be limited to presenting scheduled programming for ten stations (ten legacy channel information blocks in the vertical channel). If a greater number of legacy channel information blocks are included in the vertical column, the font size of the information presented in each legacy channel information block must be reduced in view of the height of the display, and therefore may become so small that the user will not be able to read (discern) the information therein.

Further, the number of legacy program information blocks that may be shown in any single horizontal bar is limited by the horizontal dimension of the legacy time scale bar. That is, the legacy time scale bar is only able to span a limited duration because of the limiting width of the display that is presenting the legacy EPG. Therefore, the number of legacy program information blocks that may be indicated for a particular station is limited by the limited span of the time scale bar and the sum of the widths of each particular legacy program information block (wherein the width of each particular legacy program information block corresponds to the duration of time that is required for presentation of that particular program). Also, the width of the legacy channel information block is defined by a left edge of the legacy EPG and the start of the legacy time scale bar (particularly since any added width made to the legacy channel information block decreases the available width for the legacy time scale bar).

To view information about other available stations that are not currently indicated on a presented legacy EPG, the user may page upward or downwards, and/or scroll upward or downwards, to change presentation of legacy channel information blocks that indicate the other available stations. For example, a legacy EPG may be limited to presenting ten legacy channel information blocks for stations having channel identifiers 100 through 109. If the user wishes to view available programming on the station having the channel identifier 110 (which is not indicated on the currently presented legacy EPG), the user simply pages downward one time (wherein stations having channel identifiers 110 through 119 are then displayed on the legacy EPG). Alternatively, the user may simply scroll down one channel information block (wherein stations having channel identifiers 101 through 110 are then displayed on the legacy EPG). Search functions may also be available, wherein the user enters a station or channel identifier of interest, which then causes to legacy EPG to display a group of legacy channel information blocks that include the specified station or channel identifier of interest.

To view information about available media content events that may be available beyond the limited duration of the horizontal bar of the EPG, the user can similarly "page" forward in time, or "scroll" forward in time, to thereby cause presentation of legacy program information blocks for future scheduled programs. For example, the user may page forward in increments of time corresponding to the duration of the time scale bar. Here, a single paging operation made to a legacy EPG with a time scale bar that spans six hours will then cause the legacy EPG to indicate available programs scheduled for presentation over the next six hours.

Alternatively, or additionally, the user may scroll to the right through the presented series of legacy program information blocks on any particular horizontal row, and when the last presented legacy program information block becomes focused, a next scroll operation will shift the series of presented legacy program information blocks be one unit of time (of the time scale bar). Accordingly, the legacy program information block for the next scheduled program is then indicated. Furthermore, the scrolling causes all of the legacy program information blocks for other stations presented on the legacy EPG to increment to the right by one unit of time. After the user has paged and/or scrolled forward in time, the user may then page and/or scroll backwards in time on the legacy EPG.

However, the process of paging and/or scrolling to view additional available programs scheduled for presentation by a particular station can be relatively time consuming and cumbersome to the user. Accordingly, there is a need in the arts for an improved EPG that allows a user to more readily access information related to available programming.

SUMMARY

Systems and methods of generating and presenting an enhanced electronic program guide (EPG). The enhanced EPG comprises a reduced size video, a mini guide, a single channel guide bar, and an optional preview guide bar.

BRIEF DESCRIPTION OF THE DRAWINGS

Preferred and alternative embodiments are described in detail below with reference to the following drawings.

DETAILED DESCRIPTION

Figure 1:
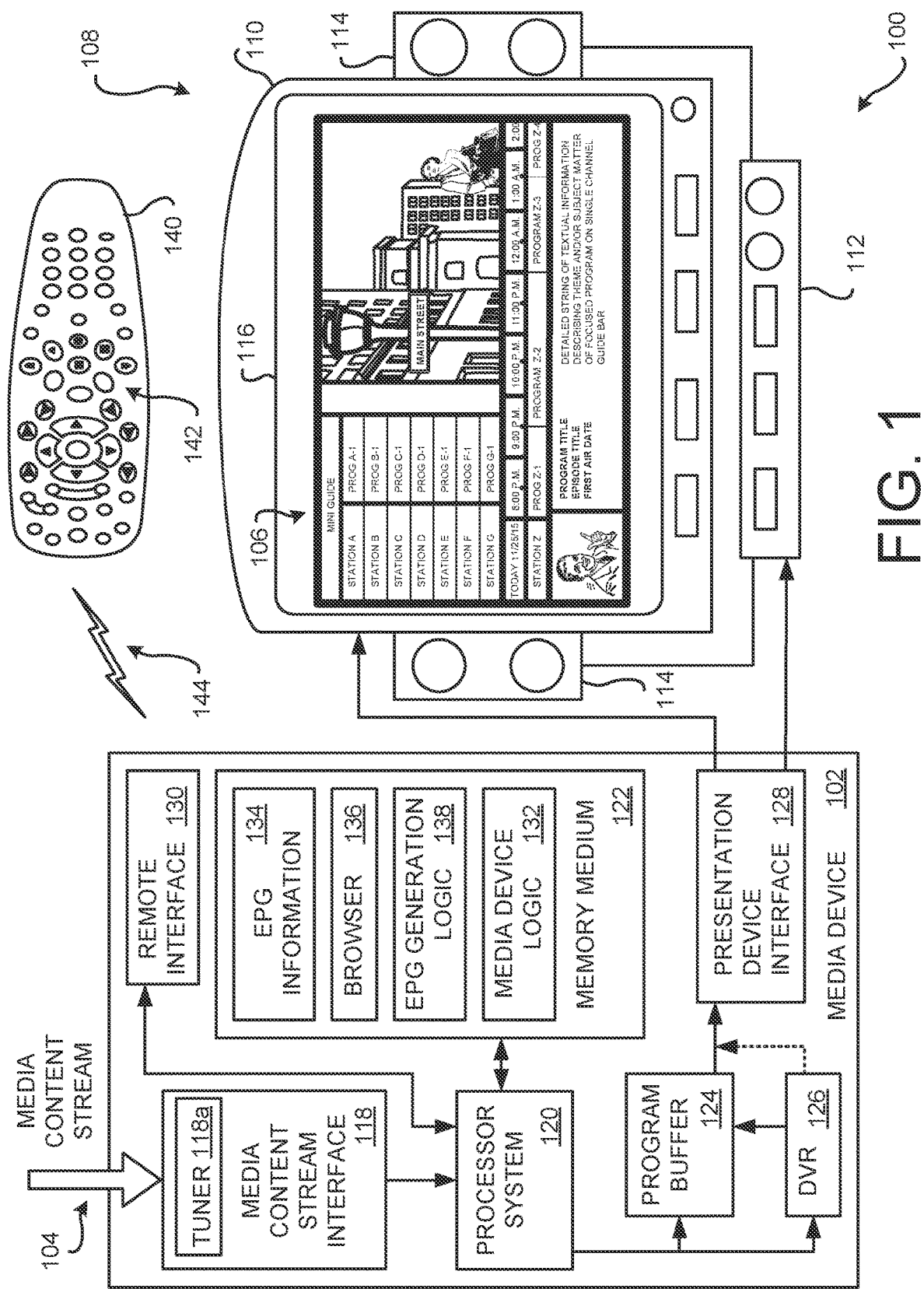
FIG. 1 is a block diagram of an embodiment of a media content event information system provisioned in a media device operating in an example environment.

FIG. 1 is a block diagram of an embodiment of a media content event information system 100 provisioned in a media device 102. The exemplary media device 102 receives a plurality of programs in a media content stream 104.

Embodiments of the media content event information system 100 are configured to construct and present an enhanced Electronic Program Guide (EPG) 106 that provides improvements over conventional legacy EPGs. The media content event information system 100 generates an enhanced EPG 106 that presents a greater amount of information and/or more relevant information about available programming than is possible on a legacy EPG.

An exemplary media device 102 includes, but is not limited to, a set top box (STB) that is communicatively coupled to a broadcast system (not shown). Other embodiments of the media device 102 include a television (TV), a digital video disc (DVD) player/recorder, a Blue-ray player/recorder, a game playing device, or a personal computer (PC). The media device 102 is configured to present selected media content events that are received in the media content stream 104.

The media content stream 104 may comprise one or more streaming media content events (referred to herein interchangeably as a "program") provided from the media content broadcast facility over the broadcast system (not shown) operated by a media content service provider. Non-limiting examples of broadcasting systems include satellite systems, cable or other wire-based systems, or over the air (OTA) broadcasting systems. Since the media content service provider is providing content from many individual program provider sources (referred to herein interchangeably as a "station"), or even thousands of different stations, some broadcasting systems provide a plurality of different media content streams 104 each providing content from one or more different stations.

The exemplary media device 102 is communicatively coupled to a media presentation system 108 that includes a visual display device 110, such as a television (hereafter, generically a TV), and an audio presentation device 112, such as a surround sound receiver controlling an audio reproduction device (hereafter, generically, a speaker 114). Other types of output devices may also be coupled to the media device 102, including those providing any sort of stimuli sensible by a human being, such as temperature, vibration and the like. The video portion of the media content event is displayed on a display 116 and the audio portion of the media content event is reproduced as sounds by one or more speakers 114. In some embodiments, the media device 102 and one or more of the components of the media presentation system 108 may be integrated into a single electronic device. The video portion of the streamed media content is displayed on the display 116 and the audio portion of the streamed media content is reproduced as sounds by the speakers 114.

The non-limiting exemplary media device 102 comprises a media content stream interface 118, a processor system 120, a memory medium 122, a program buffer 124, an optional digital video recorder (DVR) 126, a presentation device interface 128, and a remote interface 130. The memory medium 122 comprises portions for storing the media device logic 132, the electronic program guide (EPG) information 134, an optional browser 136, and the enhanced EPG generation logic 138. In some embodiments, the media device logic 132 and the enhanced EPG generation logic 138 may be integrated together, and/or may be integrated with other logic. In other embodiments, some or all of these memory and other data manipulation functions may be provided by and using remote server or other electronic devices suitably connected via the Internet or otherwise to a client device. Other media devices may include some, or may omit some, of the above-described media processing components. Further, additional components not described herein may be included in alternative embodiments.

The functionality of the media device 102, here a set top box, is now broadly described. A media content service provider provides media content that is received in one or more multiple media content streams 104 multiplexed together in one or more transport channels. The transport channels with the media content streams 104 are communicated to the media device 102 from a media system sourced from a remote head end facility (not shown) operated by the media content service provider. Non-limiting examples of such media systems include satellite systems, cable system, and the Internet. For example, if the media content provider provides programming via a satellite-based communication system, the media device 102 is configured to receive one or more broadcasted satellite signals detected by an antenna (not shown). Alternatively, or additionally, the media content stream 104 can be received from one or more different sources, such as, but not limited to, a cable system, a radio frequency (RF) communication system, or the Internet.

The one or more media content streams 104 are received by the media content stream interface 118. In a broadcast environment, one or more tuners 118a in the media content stream interface 118 selectively tune to one of the media content streams 104 in accordance with instructions received from the processor system 120. The processor system 120, executing the media device logic 132 and based upon a request for a particular program of interest specified by a user, parses out media content associated with the specified program. The program is then assembled into a stream of video and/or audio information which may be stored by the program buffer 124 such that the media content of the program can be streamed out to components of the media presentation system 108, such as the visual display device 110 and/or the audio presentation device 112, via the presentation device interface 128. Alternatively, or additionally, the parsed out media content may be saved into the DVR 126 for later presentation. The DVR 126 may be directly provided in, locally connected to, or remotely connected to, the media device 102. In alternative embodiments, the media content streams 104 may stored for later decompression, processing and/or decryption.

From time to time, information populating the EPG information 134 portion of the memory medium 122 is communicated to the media device 102, via the media content stream 104 or via another suitable content distribution system. The EPG information 134 stores information pertaining to the scheduled programming of a plurality of different programs that are available from the plurality of different stations. The information stored in the EPG information 134 portion of the memory medium 122 may include, but is not limited to, a scheduled presentation start and/or end time for each program (or a start time and a duration of the program), a channel number and/or station call letters, and descriptive information about each program, station, and/or channel. The program's descriptive information (program identification information or the like) may include the title of the program, names of performers or actors, date of creation, and a summary describing the nature of the media content event. Any suitable information may be included in the program's descriptive information, including thumbnail images and/or short duration thumbnail video clips. Upon receipt of a command from the user requesting presentation of an EPG, the information in the EPG information 134 is retrieved, formatted, and then presented on the display 116 as an enhanced EPG 106.

Some enhanced EPG 106 may include presentation of a thumbnail image and/or a thumbnail video clip. A thumbnail image is a small sized still image that imparts information pertaining to a particular program. A thumbnail video clip is a short duration video that imparts information pertaining to a particular program. The thumbnail image and/or thumbnail image clip is small enough in size to be included in an enhanced EPG 106 that is being presented on the display 116.

The exemplary media device 102 is configured to receive commands from a user via a remote control 140. The remote control 140 includes one or more controllers 142 disposed on the surface of the remote control 140. The user, by actuating one or more of the controllers 142, causes the remote control 140 to generate and transmit commands, via a wireless signal 144, to the media device 102. The commands control the media device 102 and/or control the components of the media presentation system 108. The wireless signal 144 may be an infrared (IR) signal or a radio frequency (RF) signal that is detectable by the remote interface 130.

The processes performed by the media device 102 relating to the processing of the received media content stream 104 and communication of a presentable media content event to the components of the media presentation system 106 are generally implemented by the processor system 120 while executing the media device logic 132. Thus, the media device 102 may perform a variety of functions related to the processing and presentation of one or more programs (media content events) received in the media content stream 104.

Figure 2:
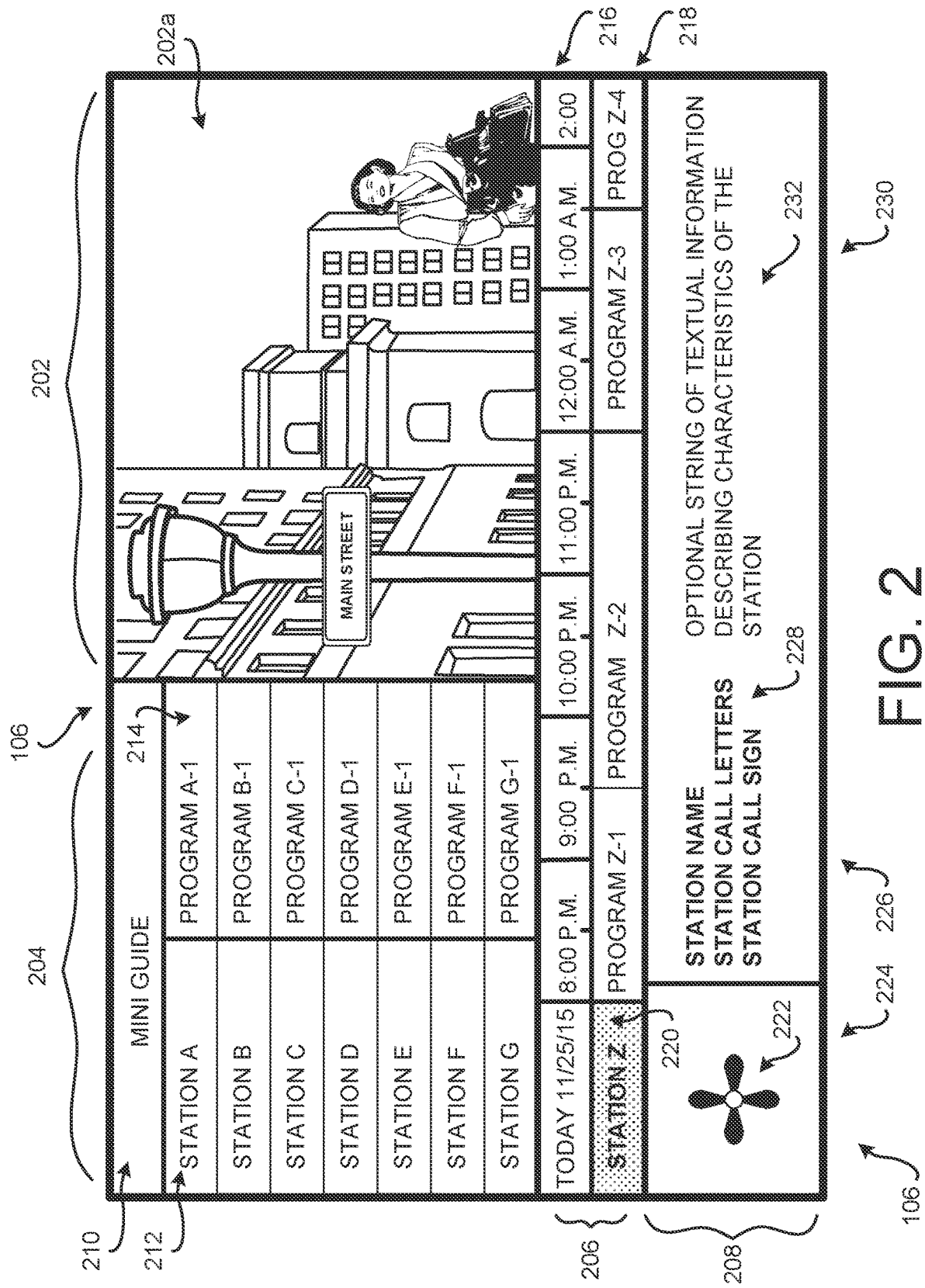
FIG. 2 is an example diagram of an enhanced electronic program guide (EPG) initially generated by an embodiment of the media content event information system.

FIG. 2 is an example diagram of an enhanced EPG 106 initially generated by an embodiment of the media content event information system 100. Initial generation of the enhanced EPG 106 may be initiated by the user actuation of one or more of the controllers 142 on their remote control 140 (FIG. 1).

The example enhanced EPG 106 comprises four regions that present information to a viewing user. The first region 202 of the enhanced EPG 106 is a reduced size image of the video portion of the currently presented program. The second region 204 of the enhanced EPG 106 is referred to herein as a "mini guide." The third region of the enhanced EPG 106 is a single channel guide bar 206. The fourth region 208 of the enhanced EPG 106 is a preview guide bar. Hereinafter, these four regions are referred to interchangeably as the reduced size video 202, the mini guide 204, the single channel guide bar 206, and the preview guide bar 208.

The reduced size video 202 is a continuing presentation of the video portion of the program that was being presented at the time that the user initiated presentation of the enhanced EPG 106. By reducing the presentation size of the full screen display of the video portion of the program to the reduced size video 202, additional space on the display 116 becomes available for presentation of the mini guide 204, the single channel guide bar 206, and/or the preview guide bar 208. Preferably, the reduced size video 202 utilizes from 50% to 20% of the area of the display 116.

In FIG. 2, the reduced size video 202 is conceptually illustrated as an image 202a of a business woman looking at a street sign while walking down a city street. Here, the reduced size video 202 is utilizing approximately 30% of the area of the display 116, and is located in the upper right hand corner of the display 116. In alternative embodiments, the area of the reduced size video 202 may vary and/or may reside in alternative locations on the display 116.

Presentation of the audio portion of the currently presented program also continues in an exemplary embodiment of the enhanced EPG 106. Accordingly, the user is able to view program viewing choices concurrently their continued viewing of the video portion and listening to the audio portion of the currently presented program.

The mini guide 204 comprises a header region 210, a first vertical bar 212 and a second vertical bar 214. The header region 210 presents the word "mini guide" to indicate to the viewing user that this region of the enhanced EPG 106 is a small scale version of an EPG that is indicating currently available programs available from the identified stations. In other embodiments, any suitable phrase, image or the like may be used to indicate the mini guide 204 in the designated region of the enhanced EPG 106.

The first vertical bar 212 of the mini guide 204 (shown on the left-hand side of the mini guide 204) presents information identifying various program provider sources (referred to herein interchangeably as a "station"). The first vertical bar 212 is divided into a series of blocks (referred to herein interchangeably as a "channel information block") stacked on top of each other to from a first vertically oriented column. In each channel information block, information is presented that identifies one of a plurality of different stations. The information presented in a channel information block in the mini guide 204 may be the same as, or similar to, the information that is presented in a legacy channel information block of a legacy EPG.

As noted herein, the width of the legacy channel information block is defined by a left edge of the legacy EPG and the start of the legacy time scale bar. In contrast, a channel information block of an enhanced EPG 106 is not limited by the constraints that limit the width of the legacy channel information block. Any width may be selected for the channel information block in the mini guide 204. Accordingly, more information may be presented in the channel information blocks of a mini guide 204 that is possible using legacy channel information blocks.

The second vertical bar 214 of the mini guide 204 (shown on the right-hand side of the mini guide 204) presents information identifying the available program that is currently being presented by the station of the horizontally adjacent channel information block. The second vertical bar 214 is divided into a series of blocks (referred to herein interchangeably as a "program information block") stacked on top of each other to form a second vertically oriented column. In each program information block, information is presented that identifies the program that is currently being presented by that corresponding station (that is indicated in the adjacent and horizontally aligned channel information block). The information presented in a program information block in the mini guide 204 may be the same as, or similar to, the information that is presented in a legacy program information block of a legacy EPG.

When a user views the example enhanced EPG 106, the user understands that the station at the top of the first vertical bar 212 (STATION A) is currently presenting a program identified in the top most block of the second vertical bar (PROG A-1). Similarly, the viewing user understands that the next station identified in the first vertical bar 212 (STATION B) is currently presenting a program identified in the adjacent block of the second vertical bar (PROG B-1).

As noted herein, the width of the legacy program information block is defined by the time scale units of a legacy time scale bar and the duration of that program. For example, if a program indicated on a legacy EPG has a one hour duration, then the width of the legacy program information block necessarily corresponds to the width of the legacy time scale bar that spans a one hour period. Similarly, if a program indicated on a legacy EPG has a half hour duration, then the width of the legacy program information block necessarily corresponds to the width of the legacy time scale bar that spans a one half hour period. Accordingly, less information can be presented about a half hour duration program indicated in a legacy program information block as can be presented about an hour long program indicated in a legacy program information block.

In contrast, a channel information block of the mini guide 204 is not limited by time scale bar constraints which otherwise limit width of legacy channel information blocks. Any width may be selected for the channel information block in the mini guide 204. Accordingly, any suitable amount of information may be presented in the channel information blocks of a mini guide 204. Here, the same amount of information can be presented pertaining to a half hour duration program indicated in a program information block of a mini guide 204 as can be presented about an hour long program indicated in another program information block of the mini guide 204.

Furthermore, in an example embodiment, program information blocks of the mini guide 204 presented in an enhanced EPG 106 all have the same width. In contrast, the width of legacy program information blocks of a legacy EPG will be different depending upon the duration of the currently presented program. Often, particularly when the user is not interested in a program that is being currently presented by a different station, the user is inherently not interested in learning about non-relevant information, such as the duration of that uninteresting program. With the mini guide 204, the amount of relevant information imparted to the user can be reduced in that the user simply understands which program is being currently presented (based on presented program identify information) by a particular station (identified by the adjacent channel information block shown in the enhanced EPG 106).

Further, the user may not be interested in knowing what programs are being broadcast at later times on the station otherwise identified in a legacy EPG. Since the user is likely not interested in such later programming, later presented programming is omitted from the mini guide 204. Accordingly, a region of the enhanced EPG 106 now becomes available for presentation of other information that is likely to be of greater interest or relevance to the user, such as presentation of the example reduced size video 202 That is, since additional legacy program information blocks for a plurality of future scheduled programs are not included in the mini guide 204 of the enhanced EPG 106, a larger sized region on the enhanced EPG 106 is available for presentation of the reduced size video 202.

Another problem encountered with legacy EPGs occurs when program broadcast or a particular program has been underway for some prior period of time prior to generation and presentation of the legacy EPG. Here, the remaining width of the legacy program information block may be somewhat misleading to a user who is viewing the legacy EPG. For example, if a program is a four hour special event program that has been underway for three hours, a user viewing the legacy EPG may erroneously conclude that the program duration is one hour (since the duration of the legacy time scale bar of one hour defines the width of the legacy program information block presented on the legacy EPG, and thereby fails to indicate the start time of that particular program three hours earlier). Thus, there is less likelihood of the user being misinformed when viewing the mini guide 204 presented by an enhanced EPG 106 since no time scale is associated with the width of the program information block of the mini guide 204.

In the event that the user has focused on one of the channel information blocks or program information blocks of the mini guide 204, a subsequent operation of one of the controllers 142 of the remote control 140 will cause an end of presentation of the enhanced EPG 106, which is then followed by presentation of the program associated with the selected channel or program information block of the mini guide 204. That is, the user us able to change channels via the enhanced EPG 106. In an embodiment of the media device 102 having a single tuner 118*a* (FIG. 1), the processor system 120 operates the tuner 118*a* to tune to the media content stream 104 having the selected channel, wherein the selected program is then parsed out and assembled into the stream of video and audio content that is presented by component of the media presentation system 108. In embodiments with multiple tuners 118*a*, the processor system 120 selects one of the tuners 118*a* and then re-tunes the selected tuner 118*a* to the media content stream 104 having the channel and/or program block that is currently focused on the mini guide 204. Then, if the user selects that focused on channel or program for presentation, the program may be more quickly presented since the selected tuner 118*a* is already pre-tuned to that media content stream 104.

The single channel guide bar 206 comprises a time scale bar 216 and a program information guide bar 218. The time scale bar 216 of the single channel guide bar 206 may be configured the same as, or similar to, the above-described legacy time scale bar. The time scale bar 216 is horizontal bar that indicates a time scale that is demarked by time units. The time scale bar 216 is preferably divided up by units of time corresponding to the hour or half hour. Hours of the day may be used to indicate particular units of time. The time scale bar 216 may be shown above or below the plurality of channel information blocks and the associated program information blocks presented in the single channel guide bar 206.

The farthest left hand side block of the time scale bar 216 may optionally indicate the current day and/or date of the week may be indicated on the time scale bar 216 of the single channel guide bar 206. In some embodiments, this farthest left hand block may be blank (present no information).

When a user initially causes the media device 102 to generate and present an enhanced EPG 106 on the display 116 (FIG. 1), the current day is indicated ("Today") and optionally the calendar date (11/25/15, which corresponds to Nov. 25, 2015). The day and/or date information changes as necessary as the user pages or scrolls towards the right to view information about future scheduled programs. The day and/or date information may be presented using any suitable date information format in the various embodiments. Any information of interest may be presented.

The program information guide bar 218 presents a single row of blocks to identify programming provided by a single presenting station (indicated in a channel information block on the left hand side of the single channel guide bar 206). Information pertaining to a currently presented program is indicated in a first program information block that is horizontally adjacent to the channel information block. Later scheduled programs are indicated in a series of time ordered program information blocks shown on the right hand side of the single channel guide bar 206.

In the exemplary single channel guide bar 206 of FIG. 2, the user intuitively understands that "Station Z" is presenting a series of programs, wherein a width of each of the program information blocks corresponds to a duration of the program identified in the respective program information block. The first program (PROGRAM Z-1) is currently being presented since the enhanced EPG 106 represents the programming available at the time of the user initiation of the generation of the enhanced EPG 106. The ending time of the first program (PROGRAM Z-1), as indicated by the time scale bar 216, is understood to be at 9:30 p.m. Similarly, the viewing user understands that a second program (PROGRAM Z-2) will begin at 9:30 p.m. and will conclude at midnight. A third program (PROGRAM Z-3) will begin at midnight, and conclude at 1:30 a.m. on the next day. Finally, the single channel guide bar 206 indicates that a fourth program (PROGRAM Z-4) will begin at 1:30 a.m. However, the program information guide bar 218 does not extend so far in time that the user is able to understand the time that the fourth program (PROGRAM Z-4) concludes.

The preview guide bar 208, here illustrated below the single channel guide bar 206, provides a region in the enhanced EPG 106 for presentation of supplemental information. In an example embodiment, the station that is currently being presented to the user at the time of the user initiation of the presentation of the enhanced EPG 106 is the station that is indicated in the single channel guide bar 206. Here, the single channel guide bar 206 is indicating that STATION Z is the currently presenting station (and thus, the reduced size video 202 is understood by the user to be the program that the user was viewing at the time that the enhanced EPG 106 was generated and presented). In some embodiments, presentation of the preview guide bar 208 is optional, is presentable in response to the user actuation one or more of the controllers 142 on the remote control 140, and/or is presentable based on what particular information is currently being presented on the enhanced EPG 106.

In the example single channel guide bar 206, the channel information block 220 indicating the station (STATION Z) is indicated as being focused (highlighted) on the enhanced EPG 106. Accordingly, supplemental information on the focused channel information block is provided in the single channel guide bar 206. Here, a graphical icon 222, such as a logo or other notoriously well known trademark or the like, is presented in an optional first region 224 of the preview guide bar 208. Any suitable information (text, graphics, still images, thumbnail videos, or the like) may be presented in the region 224. Alternatively, the region 224 may be omitted or otherwise presented with no information (left blank).

The exemplary preview guide bar 208 includes an optional second region 226 that may present textual information 228 of interest. Here, since the focused region of the enhanced EPG 106 corresponds to the channel information block indicating STATION Z, the textual information 228 indicates the station name, the station call letters, and the station call sign. Any suitable information (text, graphics, still images, thumbnail videos, or the like) may be presented in the region 226. Alternatively, the region 226 may be omitted or otherwise presented with no information (left blank).

The exemplary preview guide bar 208 further includes an optional third region 230 that may present textual information 232 of interest. Here, since the focused region of the enhanced EPG 106 corresponds to the channel information block indicating STATION Z, the textual information 232 indicates other characteristics pertaining to the station name such at information identifying the general nature of programming provided by the indicated station. For example, if STATION Z is presents sporting events of a particular type of sport, the textual information may indicate such information accordingly. Any suitable information (text, graphics, still images, thumbnail videos, or the like) may be presented in the region 230. Alternatively, the region 230 may be omitted or otherwise presented with no information (left blank).

In the example enhanced EPG 106 that is initially presented, the focus was directed to the channel information block identifying STATION Z because that station was currently presenting content when the user initiated presentation of the enhanced EPG 106. In other embodiments, other stations may be identified in the single channel guide bar 206 when the enhanced EPG 106 is initially presented. For example, but not limited to, the indicated station selected for initial presentation in the preview guide bar 208 may be a favorites channel or the like that has been predefined by the user and/or has been identified by the media device 102 using an intelligent learning algorithm to identify a user's favorite channel. Alternatively, a most watched station, a last watched station, a currently recording station (that is recording a scheduled program), or the like may be used for initial presentation in the preview guide bar 208. Alternatively, or additionally, the station selected for initial presentation in the preview guide bar 208 may be based on the identity of a particular user. Here, the user may be a parent of a household, wherein their favorite station or the like is selected by the media content event information system 100 for initial presentation in the preview guide bar 208. When another household member is operating the media device 102 (and has therefore proved or indicated their identity to the media device 102), that particular user's favorite station or the like may be selected for initial presentation in the preview guide bar 208.

In some embodiments, the station selected for initial presentation in the preview guide bar 208 may be identified by embodiments of the media content event information system 100 using the identity of the station that is presenting the currently viewed program. For example, the user may be currently watching the program having the title "PROGRAM Z-1" at the time that they initiate presentation of the enhanced EPG 106. Accordingly, the STATION Z is selected for initial presentation in the single channel guide bar 206 and/or the preview guide bar 208.

Figure 3:
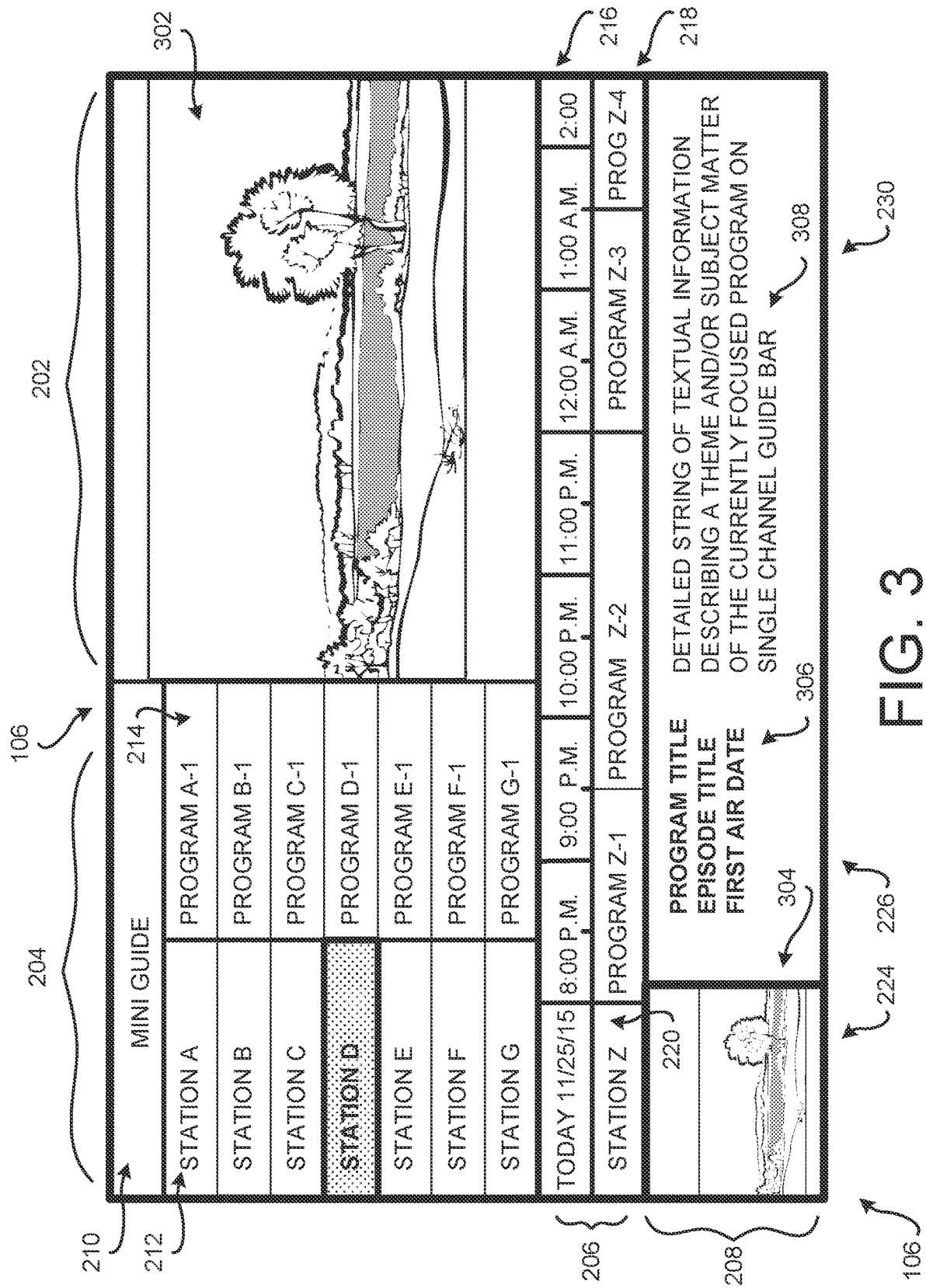
FIGS. 3-5 are example diagrams of an enhanced EPG generated at a later time by an embodiment of the media content event information system.

In practice, the user may navigate about the enhanced EPG 106 to obtain a variety of information. For example, the user may navigate to different station shown in the channel information blocks of the mini guide 204 to obtain information about the current programs that are being currently presented by the plurality of indicated stations shown in the mini guide 204. FIG. 3 illustrates an example enhanced EPG 106 wherein the user has navigated to the mini guide 204 and has selected (focused on) the channel information block indicating STATION D, which is currently presenting PROGRAM D-1. (Alternatively, the user may have navigated to and then focused the program information block indicating that PROGRAM D-1 was currently being presented on STATION D.)

Optionally, some embodiments may transition the reduced size video 202 to then present the video portion (and optionally the audio portion) of the PROGRAM D-1 that is being currently being presented on STATION D. Accordingly, the user may preview the program being presented on STATION D. Here, the preview of video portion of the PROGRAM D-1 is conceptually illustrated as the image 302, which is a scenic view of a lake and surrounding trees. In some embodiments, the user may be required to actuate one or more of the controllers 142 on the remote control 140 to change the program presented in the reduced size video 202 from the currently watched program to the program being presented by the station of the focused channel information block (or the focused program information block) indicated in the mini guide 204.

In some embodiments, when the preview video portion of a focused channel information block and/or a focused program information block is being presented in the reduced size video 202, the preview video portion 302 is changed as the user navigates about the mini guide 204 using paging and/or scrolling operations to indicate information pertaining to the currently focused on channel, station and/or program of the mini guide 204. For example, an "up channel" function or the like may be associated with one of the controllers 142 on the remote control 140. When the user actuates that controller 142, the focus moves upward by one channel information block or program information block in the mini guide 204. Such paging and scrolling functions used to navigate about the mini guide 204 operate similarly to the paging and scrolling functions used to navigate about a legacy EPG.

Alternatively, when the user is navigating about the mini guide 204, the contents of the preview guide bar 208 may be modified based on a focused channel information block and/or program information block in the mini guide 204. Here, a smaller sized thumbnail preview image 304 (corresponding to the video of the scenic view of the lake and surrounding trees) being currently presented by the PROGRAM D-1 is indicated in the region 224 of the preview guide bar 208. Here, the image 202a (FIG. 1) of the currently presented program being viewed when the user initiated presentation of the enhanced EPG 106 may continue to be shown in the reduced size video 202 region of the enhanced EPG 106 while the user is concurrently viewing the preview image 304.

Further, supplemental information pertaining to the PROGRAM D-1 is optionally shown in the regions 226 and 230 of the modified preview guide bar 208. Any suitable information of interest pertaining to the station of a focused channel information block and/or program of a focused program information block may be indicated in the preview guide bar 208.

Further, the contents indicated in the preview guide bar 208 may be modified as the user navigates about the mini guide 204. Thus, the user can be informed about content currently available on channels, stations or programs indicated on the mini guide 204.

In an alternative embodiment, selection of (focusing on) one of the channel guide bars of the mini guide 204 causes the preview guide bar 208 to display additional information pertaining to the selected channel. For example, if STATION D is focused on, the graphical icon (logo or other notoriously known trademark of the like), along with other supplemental information about STATION D, may be presented in the preview guide bar 208 (similar to the information presented in FIG. 2 for STATION Z).

The user may also navigate about the single channel guide bar 206. One or more of the controllers 142 on the remote control 140 may be configured to move focus of a program information block and/or channel information block to an adjacent program information block and/or channel information block. That is, the focus may be shifted in either a right hand direction or a left hand direction. For example, one of the controllers 142 on the remote control 140 may be associated with a move right command (and might be indicated using a rightward pointing arrow icon or the like on the controller 142). When the user actuates such a move right command controller 142, the focus on a particular program information block on the single channel guide bar 206 shifts to the right by one program information block. Similarly, another one of the controllers 142 on the remote control 140 may be associated with a move left command (and might be indicated using a leftward pointing arrow icon or the like on the controller 142). When the user actuates such a move left command controller, the focus on a particular program information block on the single channel guide bar 206 shifts to the left by one program information block. Paging operations on the single channel guide bar 206 may be made to the left or the right.

Figure 4:
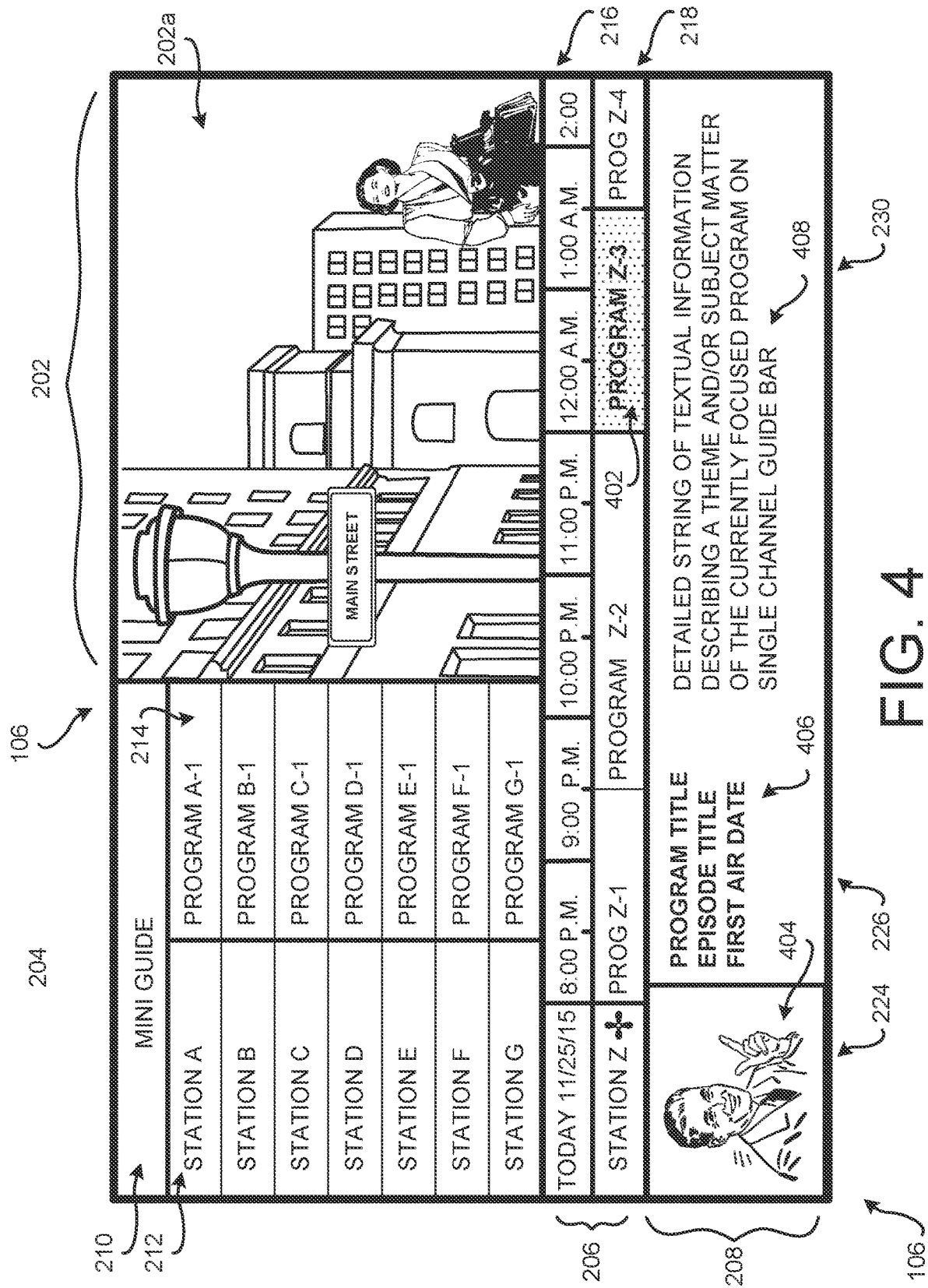

FIG. 4 conceptually illustrates a later presented enhanced EPG 106 wherein the user has navigated to the program information block associated with the PROGRAM Z-3. Here, the program information block 402 has been focused on. Here, one skilled in the art appreciates that the focus was previously set on the program information block indicating the PROGRAM Z-2, and the user has actuated the move right command controller 142, and the focus on a particular program information block on the single channel guide bar 206 then shifted to the right by one program information block to indicate the PROGRAM Z-3.

In response to focusing on the program information block 402, the content of the preview guide bar 208 is modified by the media content event information system 100. In this conceptual illustrative example, the contents of the preview guide bar 208 are modified based on a focused program information block 208 in the single channel guide bar 206. Information pertinent to the particular program indicated by the focused program information block 402 is presented in the preview guide bar 208.

Here, a smaller sized thumbnail sized preview image or video 404 (illustrated as corresponding to and image or a video of a talking man) being currently presented by the PROGRAM Z-3 is indicated in the region 224 of the preview guide bar 208. Here, the image 202a (FIG. 1) of the currently presented program being viewed when the user initiated presentation of the enhanced EPG 106 may continue to be shown in the reduced size video 202 region of the enhanced EPG 106 while the user is concurrently viewing the preview image 404. Depending on the embodiment and/or the configured operating mode, the audio portion of either the program associated with the focused program information block and/or channel information block or the currently presented program being viewed when the user initiated presentation of the enhanced EPG 106 may be listened to by the user. In some embodiments, a stock image or video associated with the indicated program may be used as the thumbnail sized preview image or video 404, wherein such a stock image or stock video is likely to be recognizable by the viewing user.

Further, supplemental information pertaining to the PROGRAM Z-3 is optionally shown in the regions 226 and 230 of the modified single channel guide bar 206. The text 406 indicates the program title, optionally indicates the episode title, and optionally indicates the first air date of the program. The text 408 may describe some aspect of the program indicated in the focused program information block 402. Any suitable information pertaining to the program of a focused program information block may be indicated in the modified single channel guide bar 206.

Paging and scrolling functions used to navigate about the single channel guide bar 206 operate similarly to the paging and scrolling functions used to navigate about a legacy EPG. For example, if the user continues to scroll in a rightward direction to move the focus to the PROGRAM Z-4, the series of program information blocks and the time scale bar 216 will shift to the left by some amount. In an example embodiment, the program information blocks and the time scale bar 216 will shift to the left so that the entirety of the program information block for PROGRAM Z-4 is indicated. Alternatively, or additionally, the program information blocks and the time scale bar 216 will shift to the left by one or more time units of the time scale bar 216.

Further, the user may change the station that is indicated in the single channel guide bar 206 in some embodiments of the media content event information system 100. In an example embodiment, a channel and/or station search pop-up menu may be presented on the display 116 in any suitable location. In some embodiments, the pop-up window may be overlaid a predefined region of the presented enhanced EPG 106. The channel and/or program of interest may then be specified by the user when the user actuates one or more of the controllers 142 on the remote control 140. In response to the specification by the user, the contents of the single channel guide bar 206 are modified to present information for the specified channel and/or station.

Additionally, some embodiments of the media content event information system 100 may be configured to permit the user to scroll upward or downward to other stations that the user intuitively appreciates is adjacent (in a legacy EPG) to the currently indicated station on the single channel guide bar 206. Here, the currently indicated station on the single channel guide bar 206 is STATION Z. The user may intuitively know that STATION Z+1 may be a station this is adjacent to STATION Z (for example, STATION Z may have a channel identifier of 100, and the user understands that STATION Z+1 has a channel identifier of 101). Thus, a single scroll operation downward would change the indicated station from STATION Z to STATION Z+1. Similarly, a single scroll operation upward would change the indicated station from STATION Z to STATION Z-1. Particular ones of the controllers 142 on the remote control 140 may be predefined to perform a single scrolling movement upward or a single scrolling movement downward to an adjacent next station. As a station change is made on the single channel guide bar 206, the supplemental information presented in the preview guide bar 208 changes accordingly.

Figure 5:
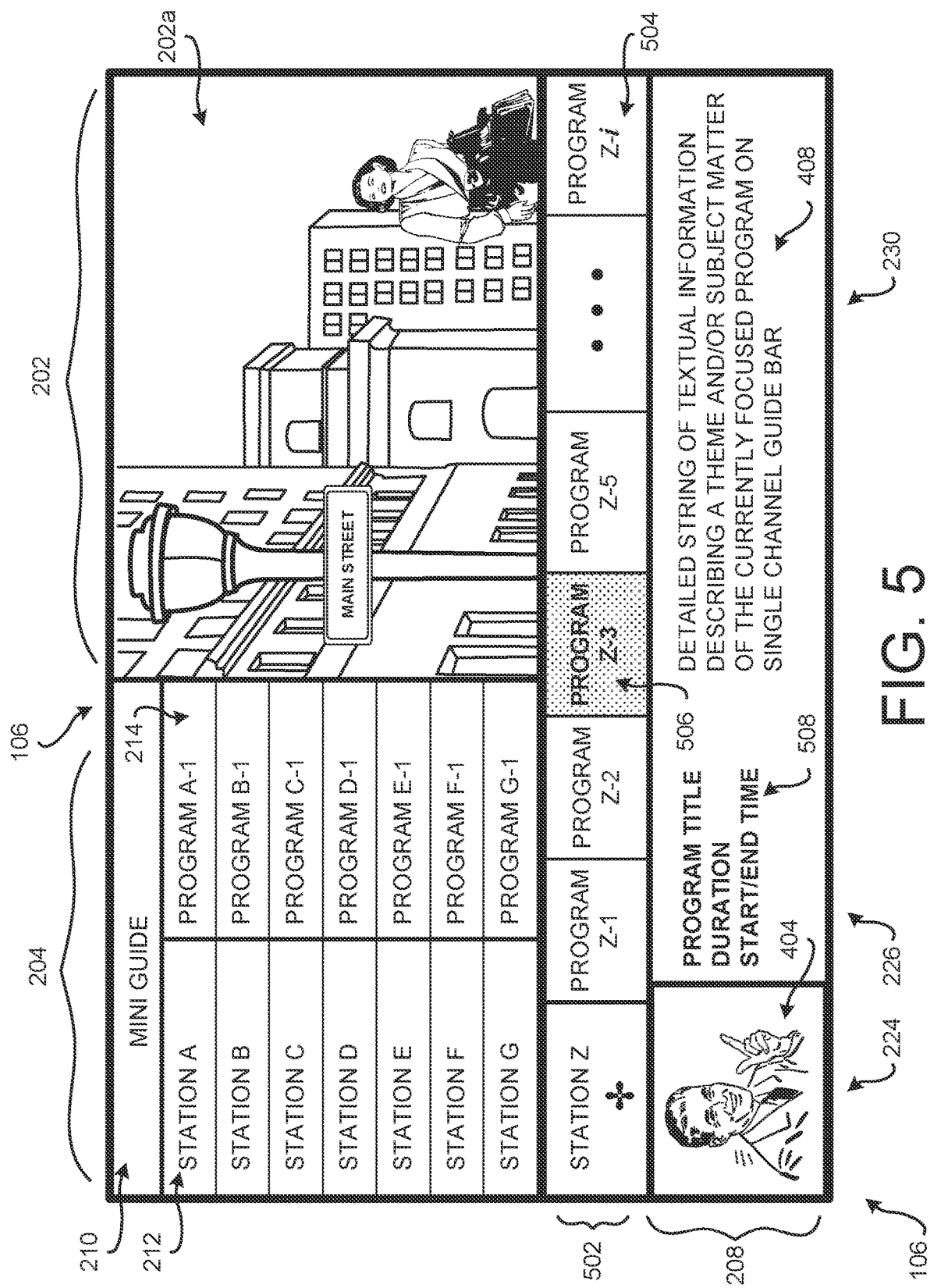

FIG. 5 conceptually illustrates an alternative enhanced EPG 106 that presents a single channel guide bar 502. The alternative single channel guide bar 502 includes a channel information blocks that indicates a particular station and a plurality of equal size, or substantially equal sized, program information blocks 504. Here, a width of each of the plurality of channel information blocks is predefined. Accordingly, a first program identified in a first one of the plurality of program information blocks may have a first presentation duration and a second program identified in a second one of the plurality of program information blocks may have a different second presentation duration, yet both program information blocks have the same predefined width.

In this embodiment, the user is able to view the scheduled series of programs that are to be provided by the indicated station, here STATION Z. Since the width of the program information blocks 504 are relatively short (as compared to a program information blocks used in a legacy EPG), a greater number of programs may be indicated in the single channel guide bar 502. Here, the user is informed of the program schedule and the names or the like of each scheduled program.

No time scale bar is used in the alternative single channel guide bar 502. Accordingly, the program information blocks 504 are presented without a graphical time reference. Because there is no time reference that controls the width of particular program information blocks, a greater number of program information blocks 504 can be presented on the single channel guide bar 502 (as compared to the limited number of program information blocks that can be presented in a single row on a legacy EPG).

For example, the width of a program information block 504 pertaining to a two hour long movie is the same width as the width of a program information block 504 pertaining to a half hour long serial program. If the information describing the programs scheduled for presentation are the same or substantially the same, less area is required for the program information blocks 504 for the longer duration movie (as compared to a program information block as used in a legacy EPG to indicate the two hour long movie).

If the user is interested in the particular details of one of the indicated programs, the user may focus onto that particular program. Here, FIG. 5 conceptually illustrates that the PROGRAM Z-3 has been focused by the user. In response to focusing onto the program information block 506 that indicates PROGRAM Z-3, the preview guide bar 208 is modified to show particular information about the program. For example, the left text 508 may indicate the program duration and/or the program start and/or ending times of the program. In such embodiments, the supplemental information shown in the preview guide bar 208 of FIG. 5 may be the same or similar to the information described above for the preview guide bar 208 of FIG. 4. Any suitable information of interest pertaining to the station of a focused channel information block and/or program of a focused program information block may be indicated in the preview guide bar 208 presented in an enhanced EPG 106 that is using the alternative single channel guide bar 502.

The exemplary reduced size video 202, the mini guide 204, the single channel guide bar 206/502, and the preview guide bar 208 of the example enhanced EPG 106 of FIGS. 2-5 may be shown in other positions in alternative embodiments of an enhanced EPG 106. For example, the single channel guide bar 206/502, and/or the preview guide bar 208, may be presented at the top portion of the enhanced EPG 106. Alternatively, or additionally, the reduced size video 202 may be presented on the left hand side of an alternative enhanced EPG 106 and the mini guide 204 may be shown on the right hand side of the alternative enhanced EPG 106. In some embodiments, one or more of the reduced size video 202, the mini guide 204, the single channel guide bar 206, and the preview guide bar 208 may be omitted from an alternative enhanced EPG 106.

It should be emphasized that the above-described embodiments of the media content event information system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method, comprising:
generating an enhanced electronic program guide (EPG), wherein the enhanced EPG includes a mini guide, a single channel guide bar, and a preview guide bar;
communicating the enhanced EPG to a display;
wherein the mini guide comprises:
a plurality of first channel information blocks arranged in a first vertical column;
wherein each one of the plurality of first channel information blocks uniquely indicates a corresponding station; and
a plurality of first program information blocks arranged in a second vertical column that is adjacent to the first vertical column;
wherein each one of the plurality of first program information blocks is adjacent to and is horizontally aligned with one of the plurality of first channel information blocks; and
wherein the single channel guide bar comprises:
a second channel information block identifying a station that is broadcasting a program that is currently being presented at the display; and
a plurality of second program information blocks arranged in a row adjacent to and horizontally aligned with the second channel information block; and
in response to receiving data indicating a user focusing on one of the plurality of first channel information blocks or one of the plurality of second program information blocks, presenting, via the preview guide bar, supplemental information pertaining to the one of the plurality of first channel information blocks or the one of the plurality of second program information blocks.

2. The method of claim 1, wherein the enhanced EPG includes a reduced size video that presents a video portion of a program that is currently being presented at a media device when a user request to view presentation of the EPG is received.

3. The method of claim 1,
wherein the second channel information block is an only channel information block included in the single channel guide bar;
wherein each of the plurality of second program information blocks identify the programs scheduled for presentation by the selected station indicated in the second channel information block, and
wherein the plurality of second program information blocks are arranged in a time ordered sequence of presentation; and
a time scale bar that is located adjacent to, and is located above or below, the program information guide bar, wherein the time scale bar is divided up by units of time.

4. The method of claim 3,
wherein in response to the user focusing on the second channel information block of the single channel guide bar, the preview guide bar presents supplemental information pertaining to the focused station.

5. The method of claim 3,
wherein the units of time correspond to at least one of an hour and a half hour,
wherein the units of time of the time scale bar correspond to a start time and an end time of each of the programs identified in the plurality of second program information blocks, and
wherein a width of each of the second program information blocks corresponds to a duration of the program identified in the respective second program information block.

6. A method, comprising:
generating an enhanced electronic program guide (EPG), wherein the enhanced EPG includes a mini guide, a single channel guide bar, and a preview guide bar, wherein the preview guide bar comprises supplemental information;
communicating the enhanced EPG to a display;
wherein the mini guide comprises:
a plurality of first channel information blocks arranged in a first vertical column;
wherein each one of the plurality of first channel information blocks uniquely indicates a corresponding station; and
the plurality of first program information blocks arranged in a second vertical column that is adjacent to the first vertical column;
wherein each one of the plurality of first program information blocks is adjacent to and is horizontally aligned with one of the plurality of first channel information blocks; and
wherein each of the first program information blocks present information that identifies a program that is currently being broadcast by the station identified in the horizontally aligned and adjacent first channel information block; and
wherein the single channel guide bar comprises:
a second channel information block identifying a station that is broadcasting a program that is currently being presented at the display; and
a plurality of second program information blocks arranged in a row adjacent to and horizontally aligned with the second channel information block; and
in response to receiving data indicating a user focusing on one of the plurality of first channel information blocks or one of the plurality of second program information blocks, presenting, via the preview guide bar, supplemental information pertaining to the one of the plurality of first channel information blocks or the one of the plurality of second program information blocks.

7. The method of claim 6,
wherein each of the plurality of second program information blocks identify the programs scheduled for presentation by the selected station indicated in the second channel information block,
wherein the plurality of second program information blocks are arranged in a time ordered sequence of presentation,
wherein a width of each of the plurality of second program information blocks of the single channel guide bar is predefined, wherein the predefined width of each of the plurality of second program information blocks is the same, wherein a first program identified in a first one of the plurality of second program information blocks has a first presentation duration, and wherein a second program identified in a second one of the plurality of second program information blocks has a second presentation duration that is different from the first presentation duration of the first program.

8. The method of claim 6, wherein in response to the user focusing on the second channel information block of the single channel guide bar, the preview guide bar presents supplemental information pertaining to the focused station.

9. The method of claim 8, wherein in response to the user focusing on the channel information block of the preview guide bar, the preview guide bar further presents supplemental information pertaining to the program that is currently being presented by the station associated with the focused on channel information block of the preview guide bar.

10. The method of claim 9, the method further comprising:

receiving a user request during presentation of the enhanced EPG, wherein the user request corresponds to a selection of one of the plurality of first channel information blocks indicated on the mini guide; and presenting a preview image on a region of the preview guide bar, wherein the preview image is one of a thumbnail size still image and a thumbnail size video, and wherein the presented still image or thumbnail size video corresponds to the program that is currently being presented by the station identified in the selected one of the plurality of first channel information blocks indicated on the mini guide.

11. The method of claim 9, the method further comprising:

receiving a user request during presentation of the enhanced EPG, wherein the user request corresponds to a selection of one of the plurality of first channel information blocks indicated on the mini guide; and presenting supplemental information describing the station identified in the selected one of the plurality of first channel information blocks on a region of the preview guide bar.

12. The method of claim 9 the method further comprising:

receiving a user request during presentation of the enhanced EPG, wherein the user request corresponds to a selection of one of the plurality of first program information blocks indicated on the mini guide; and presenting a preview image on a region of the preview guide bar, wherein the preview image is one of a thumbnail size still image and a thumbnail size video, and wherein the presented still image or thumbnail size video corresponds to the program that is identified in the selected one of the plurality of first program information blocks indicated on the mini guide.

13. The method of claim 9, the method further comprising:

receiving a user request during presentation of the enhanced EPG, wherein the user request corresponds to a selection of one of the plurality of second program information blocks indicated on the single channel guide bar; and presenting a preview image on a region of the preview guide bar, wherein the preview image is one of a thumbnail size still image and a thumbnail size video, and wherein the presented still image or thumbnail size video corresponds to the program that is identified in the selected one of the plurality of second program information blocks indicated on the single channel guide bar.

14. The method of claim 9, the method further comprising:

receiving a user request during presentation of the enhanced EPG, wherein the user request corresponds to a selection of the second channel information block indicated on the single channel guide bar; and presenting supplemental information describing the station identified in the selected second channel information block on a region of the preview guide bar.

15. The method of claim 9, wherein the station identified in the second channel information block is a first station, the method further comprising:

receiving a user request during presentation of the enhanced EPG, wherein the user request corresponds to a selection of the second channel information block indicated on the single channel guide bar; and indicating on the single channel guide bar that the selected second channel information block has been selected;

receiving a third user request, wherein the third user request corresponds to a selection of a scroll upward command;

indicating a second station in the second channel information block in response to receiving the third user request; and presenting supplemental information describing the station identified in the selected second channel information block on a region of the preview guide bar.

16. A media device comprising:

a media content stream interface configured to receive programs that are broadcast to a plurality of media devices via a broadcast system;

a memory medium configured to store electronic program guide (EPG) information; and a processor system communicatively coupled to a remote interface, the media content stream interface, and the memory medium, wherein the processor system is configured to:

generate an enhanced electronic program guide (EPG), wherein the enhanced EPG includes a mini guide, a single channel guide bar, and a preview guide bar; and communicate the enhanced EPG to a display;

wherein the mini guide comprises:

at least one region that includes a plurality of first channel information blocks arranged in a first vertical column and a plurality of first program information blocks arranged in a second vertical column that is adjacent to the first vertical column; and wherein each one of the plurality of channel information blocks uniquely indicates a corresponding station; and wherein each one of the plurality of first program information blocks is adjacent to and is horizontally aligned with one of the plurality of first channel information blocks; and wherein the single channel guide bar comprises:

a second channel information block;

wherein the second channel information block identifies station that is broadcasting the program that is currently being presented at the display; and a plurality of second program information blocks arranged in a row;

wherein the row of program information blocks is adjacent to and horizontally aligned with the second channel information block; and in response to receiving data indicating a user focusing on one of the plurality of first channel information blocks or one of the plurality of second program information blocks, present, via the preview guide bar, supplemental information pertaining to the one of the plurality of first channel information blocks or the one of the plurality of second program information blocks.

17. The media device of claim 16,
wherein in response to the user focusing on the second channel information block of the single channel guide bar, the preview guide bar presents supplemental information pertaining to the focused station.

18. The media device of claim 16, wherein the single channel guide bar includes a program information guide bar, wherein the second channel information block and the plurality of second program information blocks arranged in a row adjacent to and horizontally aligned with the second channel information block reside in the program information guide bar, and wherein the single channel guide bar further comprises:

a time scale bar that is located adjacent to, and is located above or below, the program information guide bar, wherein the time scale bar is divided up by units of time corresponding to at least one of an hour and a half hour, wherein the units of time of the time scale bar correspond to a start time and an end time of each of the programs identified in the plurality of second program information blocks, and wherein a width of each of the second program information blocks corresponds to a duration of the program identified in the respective second program information block.

19. The media device of claim 16,
wherein a width of each of the plurality of second program information blocks of the single channel guide bar is predefined, wherein the predefined width of each of the plurality of second program information blocks is the same, wherein a first program identified in a first one of the plurality of second program information blocks has a first presentation duration, and wherein a second program identified in a second one of the plurality of second program information blocks has a second presentation duration that is different from the first presentation duration of the first program.

20. The media device of claim 17,
wherein in response to the user focusing on the channel information block of the preview guide bar, the preview guide bar further presents supplemental information pertaining to the program that is currently being presented by the station associated with the focused on channel information block of the preview guide bar.

21. The media device of claim 16, wherein the processor system is further configured to:

receive a user request during presentation of the enhanced EPG, wherein the user request corresponds to a selection of one of the plurality of first channel information blocks indicated on the mini guide and the second channel information block of the single channel guide bar; and present supplemental information describing the station identified in the selected one of the plurality of first channel information blocks or the second channel block on a region of the preview guide bar.

\* \* \* \* \*